Sept. 11, 1934.  F. H. ADAMS  1,973,135
METHOD OF CUTTING SPIRAL BEVEL GEARS
Original Filed May 6, 1931  5 Sheets-Sheet 1

Fig. 1

INVENTOR:
FRANK H. ADAMS
Kwis Hudson & Kent
attys.

Sept. 11, 1934.  F. H. ADAMS  1,973,135
METHOD OF CUTTING SPIRAL BEVEL GEARS
Original Filed May 6, 1931  5 Sheets-Sheet 2

INVENTOR
FRANK H. ADAMS.
Kwin Hudson & Kent
Attys.

Sept. 11, 1934.    F. H. ADAMS    1,973,135
METHOD OF CUTTING SPIRAL BEVEL GEARS
Original Filed May 6, 1931    5 Sheets-Sheet 3

INVENTOR:
FRANK H. ADAMS.

Sept. 11, 1934.  F. H. ADAMS  1,973,135
METHOD OF CUTTING SPIRAL BEVEL GEARS
Original Filed May 6, 1931   5 Sheets-Sheet 4

INVENTOR
FRANK H. ADAMS.

Sept. 11, 1934.　　　　F. H. ADAMS　　　　1,973,135
METHOD OF CUTTING SPIRAL BEVEL GEARS
Original Filed May 6, 1931　　5 Sheets-Sheet 5

INVENTOR:
FRANK H. ADAMS.
Kwin Hudson + Kent
attys.

Patented Sept. 11, 1934

1,973,135

UNITED STATES PATENT OFFICE

1,973,135

METHOD OF CUTTING SPIRAL BEVEL GEARS

Frank H. Adams, Cleveland Heights, Ohio, assignor to The Cleveland Hobbing Machine Company, Cleveland, Ohio, a corporation of Ohio Original application May 6, 1931, Serial No. 535,340. Divided and this application November 5, 1932, Serial No. 641,377

13 Claims. (Cl. 90—4)

The present invention relates to a method of cutting spiral bevel gears, and is a division of my co-pending application, Serial No. 535,340, filed May 6, 1931.

An object of the invention is to provide an improved method of cutting spiral bevel gears, and particularly a method for cutting such gears wherein the cutter and gear blank are rotated in continuous cutting engagement with each other and are given the requisite relative movements to effect complete cutting of the teeth in the blank.

Although the method may be practiced by means of differently constructed machines, it will be described herein in connection with one form of machine by which it may be efficiently practiced that is a multiple unit or spindle turret type of machine corresponding in certain of its structural details to the multiple spindle hobbing machine shown in the patent to Sommer and Adams No. 1,732,700, granted October 22, 1929. It is to be understood, however, that, although the machine shown and described herein is of the multiple unit or spindle type, insofar as the construction of the tool and work heads of each unit of the machine is concerned, the machine could well be of the single unit or spindle type, and the invention in certain of its aspects, relates to such a machine, as well as to the multiple spindle type of machine.

Another object is to provide a method of cutting spiral bevel gears wherein the same cutter can be used to cut gears of the same circular pitch but having various angles of bevel and numbers of teeth, by adjustment of the relative angular position of the cutter head spindle and gear blank spindle, and by providing suitable relative speeds of rotation for the cutter and gear blank.

Another object of the invention is to provide a method of cutting spiral bevel gears which can be carried out on an efficient machine in which the necessary adjustments between the cutter and work heads can be readily and quickly obtained.

Further objects and advantages of the invention will be apparent to those skilled in the art from the following description of the preferred embodiment described with reference to the accompanying drawings, in which.

As previously pointed out, the invention, although applicable to a single spindle machine, is illustrated in the accompanying drawings as applied to a multiple spindle machine, the entire mechanism of which is mounted upon a fixed circular base 1, provided with a solid bottom forming a drip pan 2 to catch any lubricant dripping from the cutter. A vertical hollow column 3 is rigidly secured to the base 1 at the center thereof, and at the periphery of the base there is provided an annular drip trough 4 which has openings in the bottom thereof to permit lubricant to drain into the pan 2.

A rotary turret 5 mounted upon the column 3 has a central bearing sleeve 6 which fits upon the top of the post 3, and is supported by a thrust bearing 7 adjustably supported on the column 3 by an adjusting collar 8. Outwardly from the central column 3 the turret rotates upon a bearing surface 9 carried by the base 1.

Figure 1:
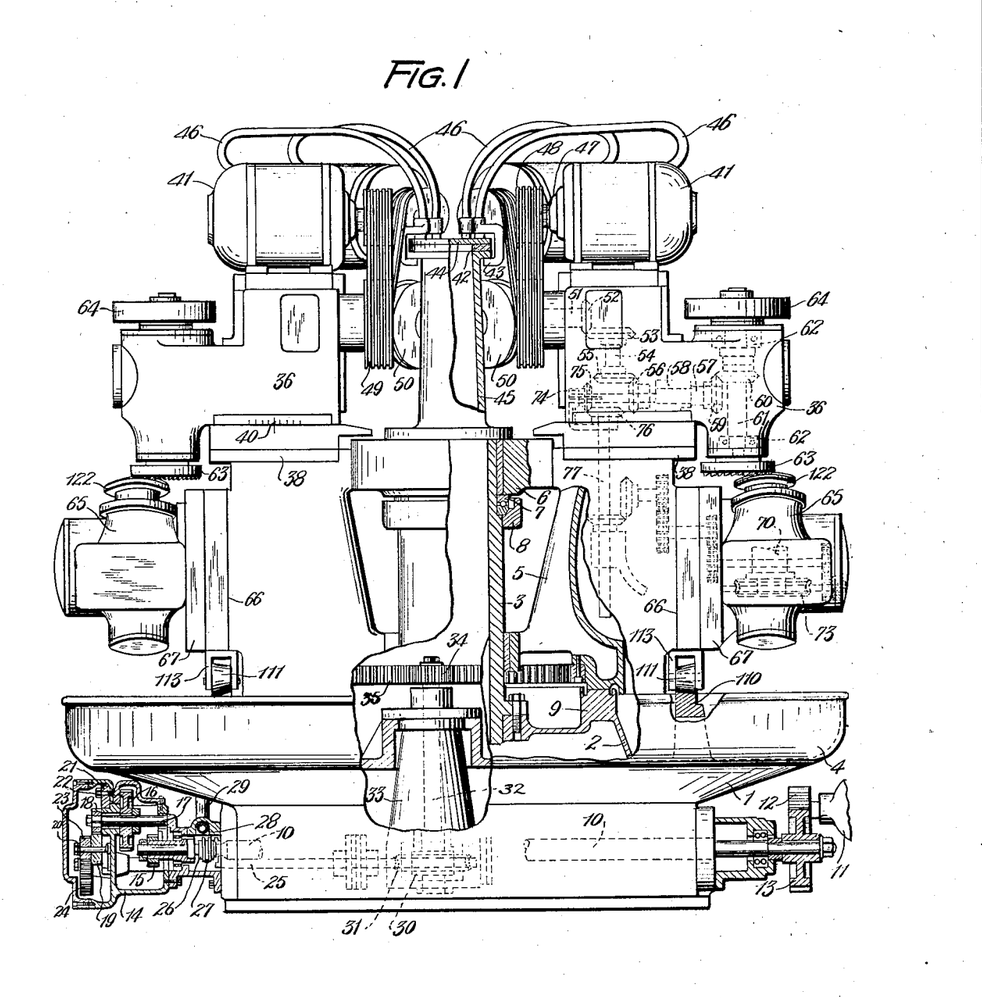
Figure 1 is an elevation of a multiple spindle spiral bevel gear cutting machine adapted to carry out the method of the present invention with certain portions broken away and shown in section.
Figure 2:
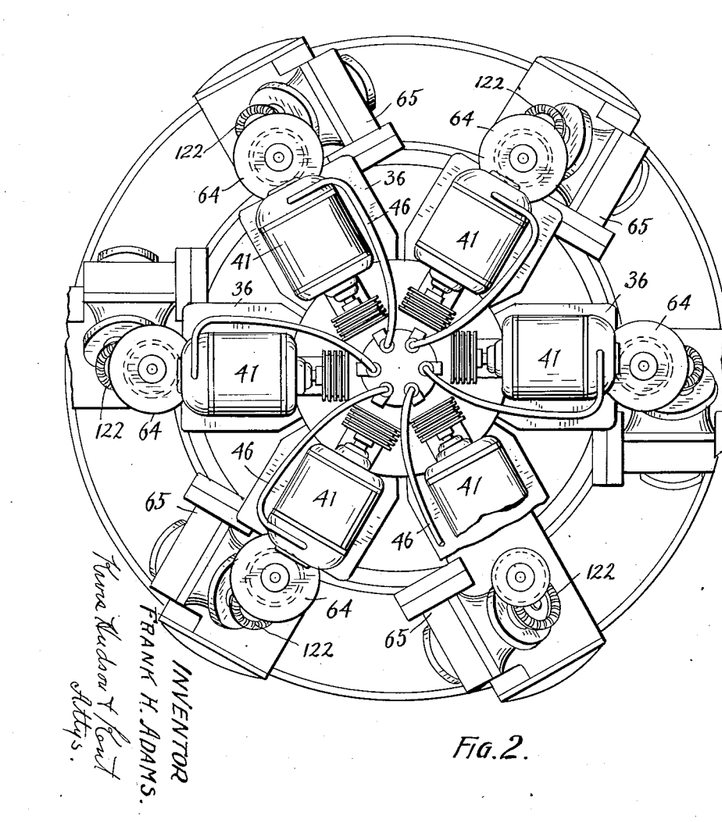
Fig. 2 is a plan of the machine shown in Fig. 1.

A drive shaft 10 driven from any suitable source of power, such as an electric motor 11 connected thereto, as by the pinions 12 and 13 on the motor rotor shaft and the drive shaft 10, respectively, extends through the base 1 and into a gear case 14 at one side of the base. Within the gear case 11 there is a speed reducing gear train consisting of a gear 15 on the shaft 10 in mesh with a gear arranged on a countershaft in the casing, which countershaft has fixed thereto a second gear in mesh with a large gear 16 arranged on a second countershaft 17 provided with a small gear 18 fixed thereto. In the sectional view of the gear case 11 shown in Fig. 1, the first mentioned countershaft and its gears are not illustrated since they are clearly illustrated and described in United States Patent No. 1,878,656, issued September 20, 1932, and the construction of the gear casing and the gear train forms no part of the present invention.

The gear 18 meshes with a gear 19 fixed on a shaft 20 carried by a bracket 21 adjustably supported by the gear casing by means of a bolt 22 extending through a slot in the bracket and anchored at its end in the casing. A second gear 23 fixed to the shaft 20 meshes with a large gear 24 on a shaft 25 extending into the base parallel with the shaft 10.

Inwardly of the gear 15 the shaft 10 is provided with a clutch 26 for controlling the rotation of the turret 5. The clutch 26 is actuated to engaged and disengaged position by means of a shifting yoke 27 fixed on a shaft 28 arranged horizontally in the clutch housing and oscillated by means of an actuating lever 29 secured to its end. The shaft 25 is driven at a much lower rate of speed than the main driving shaft 10 and operates gearing for rotating the turret 5. This gearing includes a worm 30 arranged on the shaft 25 in mesh with a worm wheel 31 fixed on a vertical shaft 32 rotatably mounted in a post 33 in the base of the machine and a pinion 34 fixed on the upper end of the vertical shaft in mesh with a large internal gear 35 fixed to the turret 5. It will thus be seen that the gear train for rotating the turret is such that the rotation is relatively slow for reasons well understood by those skilled in the art. In the case of a single spindle machine where the turret is not present, it is necessary merely to employ a drive means for rotating a cam track later to be explained.

The slowly rotating turret 5 supports the tool and work head units of the machine, of which there are six in the embodiment illustrated herein, although, the number of units may be varied as desired. The tool head of each unit is indicated generally at 36, and is slidably mounted on the turret upon horizontal ways 37 for adjustment radially of the turret axis for a reason later to be explained. Each tool head is held in position on the ways by gibs 38 and is movable radially of the turret axis by means of an adjusting screw 39, the construction and operation of which is well understood in the art and is fully disclosed in my above mentioned Patent No. 1,878,656. Each work head 36 is also provided with a suitable scale 40 bearing the proper indicia and cooperating with a zero mark on the turret to indicate the radial position of the tool head. As previously mentioned, there are six of these tool heads in the machine disclosed and they are spaced circumferentially of the turret and can be moved radially of the turret axis to adjust the axes of the cutters carried thereby with respect to the axes of the gear blanks on the work heads, as will later be explained.

Although the tool spindles may be driven from the main drive shaft 10 as in the above mentioned Patents Nos. 1,732,700 and 1,878,656, it is proposed in the particular machine disclosed herein to employ a separate drive for the tool and work spindles of each unit of the machine, and to this end a motor 41 is mounted on each of the tool heads 36. Current may be supplied to the motors 41 in any suitable manner, as for example, by brushes 42 carried by a rotatable support 43 and engaging a contact plate 44 connected to one side of a source of current supply and arranged on the upper end of a column 45 supported upon the vertical hollow column 3. The brushes 42 are connected to the motor by suitable leads extending through conduit pipes 46, and the circuit may be completed through a ground connection.

The motor shafts 47 of the motors 41 extend radially inwardly toward the center of the machine and are each provided with a driving pulley 48; a belt 49 travels around such pulley and a driven pulley fixed to the inner end of a rotatable shaft 51 carried by the tool head 36 and extending radially outwardly of the machine. The shaft 51 has at its outer end a bevel gear 52 meshing with a bevel gear 53 fixed on a vertical shaft 54 rotatably supported in suitable bearings (not shown) in the tool head. The lower end of the vertical shaft 54 has fixed thereto a bevel gear 55 meshing with a bevel gear 56 fixed on a horizontally extending shaft 57 rotatably mounted in a bearing 58 in the tool head, and the outer end of the shaft 57 has fixed thereto a bevel gear 59. The bevel gear 59 meshes with a bevel gear 60 fixed on a vertically extending shaft 61 intermediate the ends of said shaft. The shaft 61 is rotatably mounted in bearings 62 provided in the tool head and extends outwardly of the tool head at its upper and lower ends. A tool or cutter 63 is secured on the lower end of the shaft 61 by means well known in the machine tool art, and a fly or balance wheel 64 for eliminating excess vibration is fixed to the upper end of the shaft 62.

The work head of each unit is indicated generally at 65 and is slidably supported upon vertical ways 66 formed on the turret 5 parallel to the turret and tool spindle axes. Each work head comprises a portion 67 slidable on the ways 66 and a portion 68, carrying a work spindle 70 swivelled upon the portion 67 on arcuate concentric guideways 69 formed on such portion. The work spindle 70 is supported at its opposite ends in suitable bearings 71 and 72 and has fixed thereto, intermediate its ends, a worm wheel 73. The work spindle 70 is driven by the motor 41 through the driving connections now to be described.

The shaft 57 in the tool head 36 extends rearwardly and passes loosely through a bracket 74 secured to the turret 5 and extending upwardly between the ways 37 and an opening formed in the under side of the tool head. A bevel gear 75 slidably keyed to the shaft 57 so as to permit relative movement between said gear and shaft upon radial adjustment of the tool head is held between the bracket 74 and a bevel gear 76 arranged on the upper end of a vertically extending shaft 77 rotatably supported in the turret 5.

Figures 3, 5, 6:
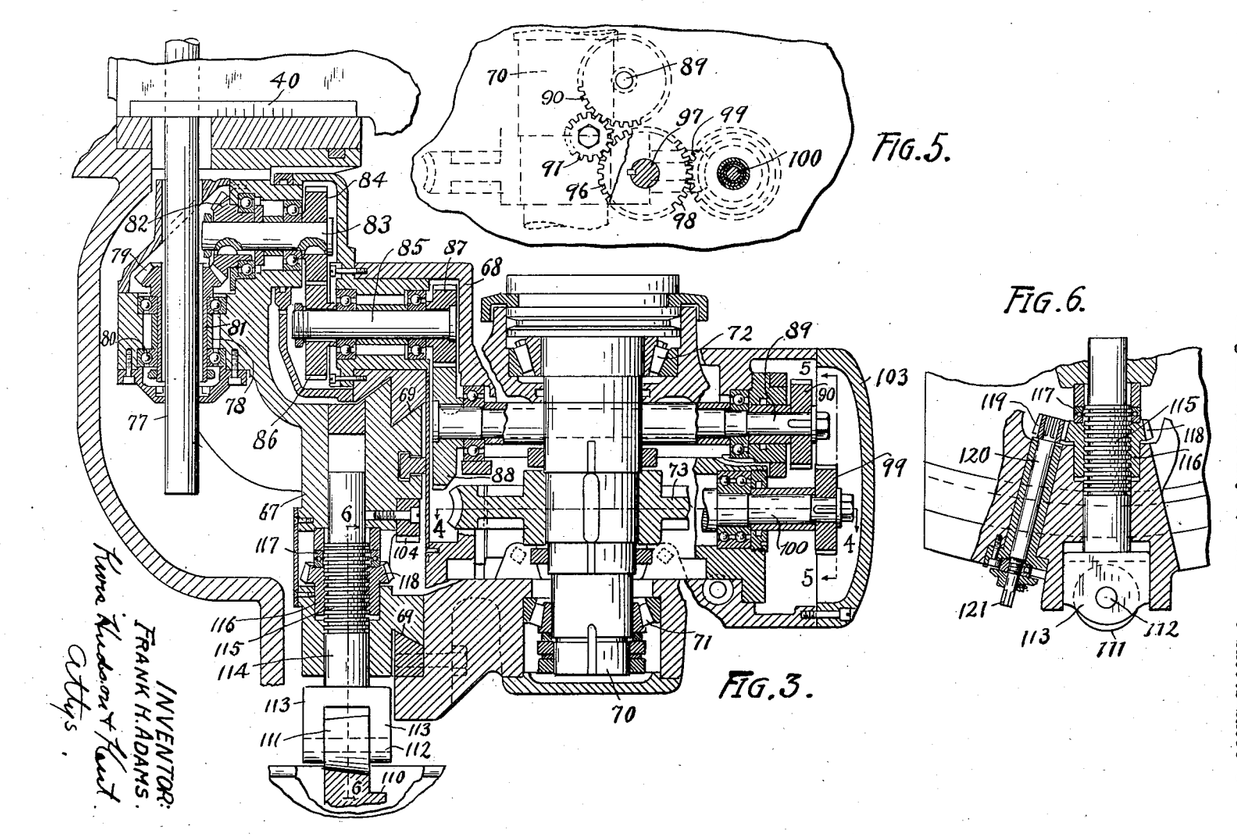
Fig. 3 is an irregular vertical section through one of the work heads of the machine.
Fig. 5 is a detail view, partly in section and partly in elevation, taken substantially on line 5—5 of Fig. 3, looking in the direction of the arrows.
Fig. 6 is a vertical section taken on line 6—6 of Fig. 3, looking in the direction of the arrows.

The portion 67 of the work head is provided with an inwardly extending bearing sleeve 78 in which is rotatably mounted, upon suitable bearings 80, a bevel gear 79 provided with an elongated sleeve 81 slidably keyed to the shaft 77 to operatively connect the gear 79 with said shaft while permitting vertical movement of the work head. The bevel gear 79 meshes with a bevel gear 82 fixed on one end of a countershaft 83 carried by the portion 67 of the work head, the opposite end of which has a spur gear 84 fixed thereto. A countershaft 85 rotatably supported in suitable bearings carried by the portion 68 of the work head has fixed thereto at its inner end a gear 86 meshing with the gear 84 and at its outer end a gear 87 which in turn meshes with a gear 88 fixed on a shaft 89 extending outwardly through the portion 68 of the work head, as clearly shown in Figs. 3 and 5.

Figure 4:
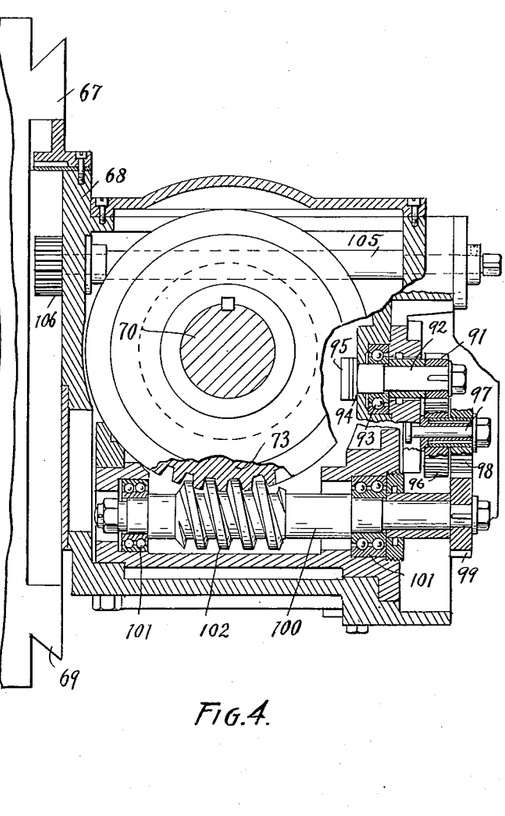
Fig. 4 is a horizontal section through the work head shown in Fig. 3, taken substantially on the line 4—4 of Fig. 3, looking in the direction of the arrows.
Figure 7:
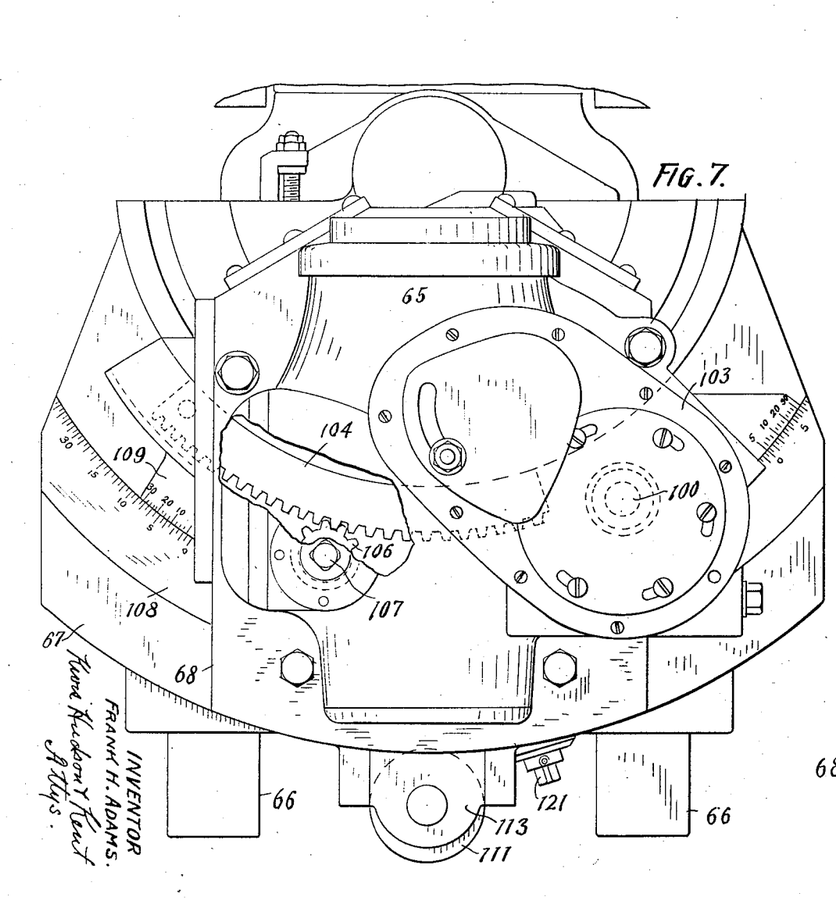
Fig. 7 is a fragmentary front elevation of the work head shown in Fig. 3, certain portions being broken away and shown in section.
Figure 8:
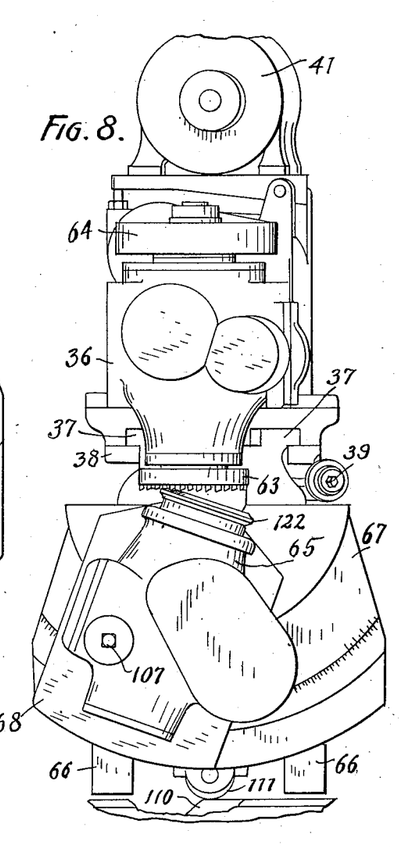
Fig. 8 is an elevation of one of the tool and work head units of the turret of the machine.

The shaft 89 lies closely adjacent one side of the work spindle and a gear 90 secured to its outer end meshes with a pinion 91 fixed on a stub shaft 92 rotatably supported in the front of the work head and located nearer the center line of the work spindle than the shaft 89. The stub shaft 92 is supported in bearings 93, as shown in Fig. 4, and a suitable thrust collar or thrust bearing 94 is interposed between the work head housing and a head 95 of the shaft 92. The pinion 91 meshes with a gear 96 fixed on a second stub shaft 97 carried by the work head housing, as clearly shown in Figs. 4 and 5, the axis of this shaft 97 is located to the right of the axis of the shaft 89, as viewed in Fig. 5. A second gear, indicated at 98, fixed on the shaft 97 in front of the gear 96, meshes with a gear 99 fixed to a worm shaft 100 which extends through the work head radially inwardly of the machine and is located on the same side of the axis of the work spindle 70 as is the shaft 89, although below and to the right thereof, as viewed in Fig. 5. The worm shaft 100 is supported in suitable bearings 101 adjacent its opposite ends and has either integral therewith or fixed thereto a worm 102 arranged intermediate the bearings 101 for the shaft 100 and meshing with the worm wheel 73 on the work spindle.

It will be seen from the foregoing description that the work spindle 70 is driven from the motor 41 and that the driving connections therefor permit the radial adjustment of the tool head, the vertical movements of the work head and the angular swivel movement of the portion 68 of the work head. This last movement merely causes the gear 86 to travel around the circumference of the gear 84. As will be explained more in detail later, the gear train for driving the work spindle is so selected that the ratio of rotation between the tool spindle and the work spindle will be one divided by the number of teeth to be cut in the gear blank, that is, the tool spindle rotates as many times faster than the work spindle as there are teeth in the gear blank, all of which will be more fully explained hereinafter.

The portion 68 of the work head is provided on its outer side with a removable cover plate 103 to give access to the gears 90, 91, 96, 98 and 99 so that they may be removed and another set of gears of suitable ratio substituted therefor when it is desired to cut gears having a different number of teeth than the number of teeth in the gears cut on the machine when using the train of gears just above mentioned for rotating the work spindle. In other words, by changing the gear train in the work head the proper relative speeds of rotation of the cutter and gear blank are obtained to enable gears of the same circular pitch but having various numbers of teeth to be cut on the machine.

Since it is necessary, as will be more fully pointed out hereinafter, to adjust the relative angular positions of the axes of the tool and work spindles to cut gears having different angles of bevel, the portion 68 of the work head is swivelly mounted with respect to the portion 67 upon the concentric arcuate guide ways 69 formed on the portion 67. In order to facilitate the adjustment of the work spindle and to enable the operator to readily move or adjust the portion 68 of the work head upon the arcuate guide ways 69 the portion 67 has secured thereto, intermediate the guide ways 69 and concentric therewith, an arcuate rack 104, and the portion 68 has rotatably mounted therein a shaft 105 located on the opposite side of the work spindle from the worm shaft 100 and below the plane of said worm shaft. The shaft 105 extends through the rear side of the portion 68 and has a pinion 106 secured thereto and arranged to mesh with the rack 104. The other end of the shaft 105 extends outwardly through the front side of the portion 68 of the work head and has a squared wrench receiving end 107, whereby the operator of the machine may readily turn the shaft 105 in the proper direction to swing the portion 68 of the work head relative to the portion 67 thereof, to obtain the desired angular relationship between the work spindle and the tool spindle axes. The portion 67 of the work head is provided with an arcuate scale 108 cooperating with a complementary scale 109 carried by the portion 68, which scales have suitable graduations and indicia to indicate the angular position of the axis of the work spindle with respect to the axis of the tool spindle.

Since the cutter and the gear blank during the entire operation are continuously rotated in cutting engagement, it is necessary to provide a relative feeding movement between the cutter and blank so that the former can cut teeth on the blank of the proper tooth depth and to this end it is proposed to move the work head axially of or towards the cutter spindle. Accordingly, the base 1 of the machine has arranged thereon a circular cam track 110 (see Figs. 1 and 3) concentric with respect to the turret axis and provided with proper varying contours on its upper surface which raise and lower the work heads of each unit during the rotation of the turret through the medium of a roller 111 carried by each of the work heads. This arrangement is similar to the arrangement shown in the above mentioned Patents Nos. 1,732,700 and 1,878,656, and is not herein described in detail, suffice it to state that the contour of the cam track is such that each work head is raised by successive steps until the cutter teeth have cut the interdental spaces of the gear blank to the desired root plane and then lowered to separate the cutter and blank, and permit the loading operation. In the case of a single spindle machine, wherein the tool and work heads are not mounted on a rotating turret, a similar cam track is employed, and suitable actuating means is provided for rotating the cam track to furnish the necessary displacement of the work head axially of the cutter spindle.

As previously stated, each work head is provided with a roller 111 arranged to travel on the upper surface of the cam track 110. This roller 111 is rotatably mounted on a pin 112 supported in the arms 113 of a fork carried by the lower end of a screw shaft 114 mounted in the portion 67 of the work head and arranged for vertical adjustment therein. In order to obtain this vertical adjustment of the shaft 114 the same is provided with screw threads 115 intermediate its ends, and a threaded adjusting nut 116 is rotatably arranged on the threaded portion 115 of the shaft, with a suitable thrust bearing 117 for taking the upward thrust of the nut 116. The nut 116 has formed integral therewith a beveled gear 118 in mesh with a bevel pinion 119 (see Fig. 6) fixed to the upper end of a downwardly and diagonally extending rotatable shaft 120 mounted in the lower portion 67 of the work head. The shaft is provided at its outer and lower end with a wrench receiving portion 121 whereby the operator may apply a wrench to the shaft 120 and rotate the same in the proper direction to adjust the vertical position of the work head to obtain the initial cutting relationship between the cutter and gear blank.

The method and machine of the present invention are particularly adapted to the cutting of spiral bevel gears, that is, bevel gears wherein the interdental spaces and teeth are curved from end to end upon the arcs of spirals although other types of gears may be cut thereby. In the drawings the gear blanks are indicated at 122 and are shown having finished or partly finished teeth. The blanks are secured coaxially upon the work spindles 70 in any well known or preferred manner.

Referring to Figs. 9 to 12 inclusive of the drawings, wherein the blank 122 is illustrated as completely cut showing the ultimate tooth form, the relative positions of the cutter 63 and gear blank 122 are indicated somewhat diagrammatically. The cutter 63 comprises an annular disk-like member from one face of which extend the cutting teeth 123 in a direction generally parallel to the axis thereof. The cutting teeth 123 constitute a series of teeth arranged on a spiral. As illustrated the series includes only one turn of the spiral with the first and last of the series (indicated at 123a and 123b, respectively,) adjacent each other and separated a distance measured radially of the member equal to the circular pitch of the gear to be cut.

The teeth 123 of the spiral series of cutting teeth increase in width or thickness from one end of the series to the other, that is the first tooth 123a of the series is the narrowest and the last tooth 123b is the widest or thickest, with the intermediate teeth of the series of gradually varying width. The sides of each cutting tooth taper inwardly toward each other, as indicated by the lines 124, and the ends of each tooth are formed with the necessary rake, as indicated at 125 Fig. 12; the taper 124 and rake 125 with the transverse gashes 126 between the teeth give the required clearance for the cutting action of the teeth as they pass through the tooth spaces of the gear blank. The junction of the sides and end faces of the teeth with the front face thereof form the cutting edges 127 and 128. The transverse width of the teeth including the plane including the cutting edges 127 and 128 gradually increases from the first tooth 123a to the last tooth 123b of the spirally arranged series of teeth 123, in other words the distance of the cutting edges from a theoretical spiral which passes through the center of a theoretical cutting frustum gradually increases towards the rear tooth.

The gear blanks 122 are conical blanks of suitable form, according to the character of the gear to be cut, and are mounted on the work spindles 70 with the apex of each of the gear cones lying in the line of the axis of a work spindle 70. As the tool and work rotate in the directions indicated, the width of the theoretical cutting frustum which will pass through the ultimate interdental spaces of the gear being cut and stay within the confines thereof will vary, and as illustrated only a small portion of the theoretical frustum is used and the teeth actually employed vary somewhat therefrom. Assuming, for the purposes of illustration, that teeth were located along the entire theoretical frustum it will be apparent that the teeth at the end of the frustum of largest radius would cut diagonally across the interdental spaces in one direction and the teeth at the end of the frustum of smallest radius would cut diagonally across the interdental spaces in an opposite direction, and that a tooth intermediate the ends of the frustum can be made to cut both sides of an interdental space on an intermediate radius. The path of any particular tooth of the cutter, with reference to the gear blank, is varied from that of a circular arc because of the rotation of the blank.

Figure 12:
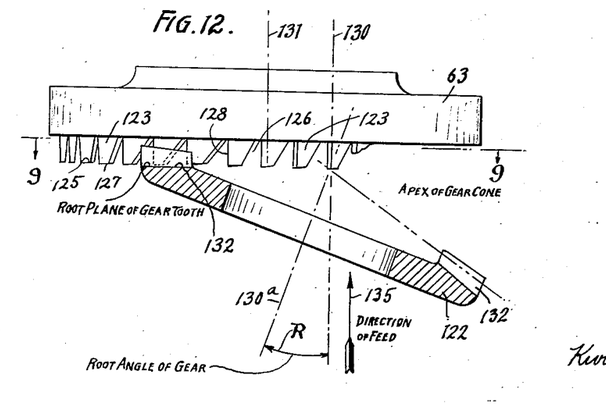

The operator of the machine through the medium of the rotatable shaft 105, rack 104, and pinion 106 may swing the portion 68 of the work head to its proper angular position, as indicated by the scales 108 and 109. In the embodiment of the invention illustrated the angular position of the portion 68 of the work head is computed in accordance with the root angle or angle of bevel of the gear to be cut, and is equal to the angle of bevel of the gear, but it is to be understood that the angle may be varied from that shown as desired. The angular position of the gear blank with respect to the cutter is shown in Fig. 12, wherein 129 indicates the apex of the gear cone, 130 the axis of the gear blank and work spindle when the same is parallel to the cutter spindle or axis 131, 130a the axis of the blank and work spindle when angularly adjusted with respect to the cutter axis 131, and R the angle included by axes 130 and 130a, which as illustrated is the root angle or angle of bevel of the gear. The root plane of the teeth of the gear is indicated at 132 and the gear is arranged so that the root plane of the gear teeth at the point where the cutter teeth pass through the blank is perpendicular to the cutter axis. The adjustment of the angular position of the portion 68 of the work head causes the gear blank to swing about a point 129, which coincides with the apex of the gear cone an amount equal to the root angle of the gear tooth. Since the axis of the cutter is normal to the root plane of the teeth of the gear, the interdental spaces increase in width towards the periphery of the gear blank.

Figures 9, 10:
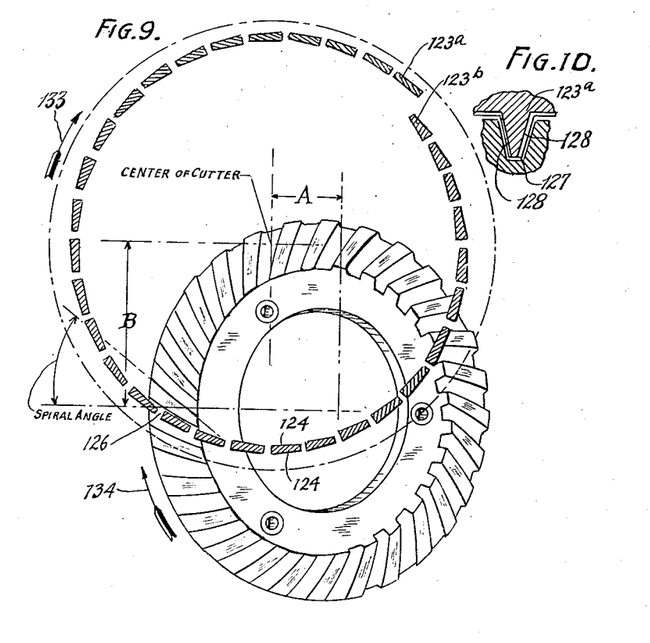
Fig. 9 is a sectional view on line 9—9 of Fig. 12.
Figs. 10, 11, and 12 are diagrammatic views showing the relationship between the cutter and gear blank.
Figure 11:
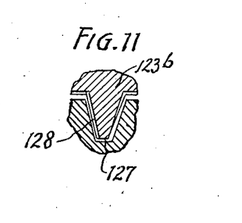

The cutter head 36 is adjusted radially of the machine by means of the adjusting screw 37, to offset the axis 131 of the cutter with respect to the axis 130 of the blank, as indicated at A in Fig. 9, so that the teeth of the cutter will have the proper cutting relationship with the gear blank. The offset position of the cutter center with respect to the work center is dependent upon the spiral angle and is a combination of the angular setting of the work spindle and the radial setting of the cutter spindle, which two settings are indicated in Fig. 9 by offsets "A" and "B", in relation to the work center.

The work head is adjusted vertically, by means of the adjustable roller 111, to bring the first tooth 123a of the cutter into the initial cutting position with respect to the blank. After this adjustment, the machine is in condition to be operated and the gear cut by the cutter.

The operation of the machine causes the cutter to be rotated in the direction indicated by the arrow 133 and the gear blank to be rotated in the same direction, as shown by the arrow 134, (see Fig. 9). The rates of rotation of the cutter and blank are in the ratio of the number of teeth in the gear to be cut to one, that is, if there are twenty-two teeth in the gear to be cut the cutter will rotate twenty-two times to every one revolution of the gear blank.

The rotation of the cutter and blank in cutting engagement causes the first and narrowest tooth 123a of the cutter to mill out a shallow spiral groove across the gear blank and diagonally across the ultimate interdental space. The succeeding teeth 123 of the series of teeth each widening the groove until the last and widest tooth 123b has passed through. As the last tooth 123b is passing through the groove, the first tooth 123a commences to cut a second groove or intermediate space. This action is repeated until spiral grooves have been cut completely around the blank, corresponding in number to the interdental spaces of the gear. The rotation of the cutter and blank in cutting engagement continues until the cutting edge 127 of the cutter teeth has reached the root plane of the gear teeth, the blank having been fed toward the cutter in a direction parallel to the cutter axis (see 135, Fig. 12) by means of the cam track 110, roller 111, and vertically movable work head.

The configuration of the plane included by the cutting edges 127 and 128 of the last tooth 123b of the cutter is complementary to the interdental spaces of the gear, with the result that both faces of the gear teeth are formed in the same operation.

It will be understood that the arrangement of the cutter teeth may be reversed, that is, the inner tooth of the series could be the narrowest and the outer tooth the widest, provided the cutting edges and the direction of rotation of the blank and cutter are reversed.

From the foregoing description it will be apparent that applicant has provided a method for cutting spiral bevel gears in which there is a relative compound movement between the tool and the gear blank during the cutting operation, comprising three movements, one of which is a rotation of the cutter relative to the gear blank, another the relative feeding movement between the cutter and the gear blank, and the third an additional relative movement between the cutter and the gear blank which is, in effect, a translation of the cutter about the periphery of the blank.

While the preferred embodiment of the invention has been illustrated and described, it is to be understood that the invention may be carried out in machines having a different construction from that shown. In the machine illustrated the compound relative movement referred to above comprises the rotation of the cutter relative to the gear blank, the relative feeding movement between a cutter and a gear blank and the rotation of the blank which, in effect, produces the translation of the cutter about the periphery thereof, and it will be apparent that this translation of the cutter relative to the periphery of the blank may be produced in ways other than those illustrated, such as by maintaining the gear blank stationary, and moving the axis of the rotating cutter in a closed path about the axis of the blank, and I do not wish to be limited to the particular construction illustrated and disclosed, which as pointed out above may be varied within the scope of this invention, and I particularly point out and claim as my invention:

1. The method of cutting gears which comprises rotating a series of spirally arranged cutting teeth extending in a direction generally parallel with the axis of rotation thereof across the face of a gear blank, each of a plurality of said teeth being provided with a cutting edge on a side thereof the distance of which cutting edge in a direction radially of the axis of rotation from a theoretical cutting spiral that will pass through the interdental spaces of the gear to be cut gradually increasing towards the rear of said series of teeth, and simultaneously rotating the gear blank.

2. The method of cutting gears which comprises rotating a series of spirally arranged cutting teeth extending in a direction generally parallel with the axis of rotation thereof and provided with cutting edges on the sides thereof the distance of which cutting edges from a theoretical cutting spiral that will pass through the interdental spaces of the gear to be cut and stay within the confines thereof increasing towards the rear of said series of teeth across the face of a tapered gear blank in cutting relationship therewith, and simultaneously rotating said blank and producing relative feed movement between said teeth and said blank.

3. The method of cutting gears which comprises rotating a series of spirally arranged cutting teeth extending in a direction generally parallel with the axis of rotation thereof and provided with cutting edges on a side thereof the distance of which cutting edges radially from a theoretical cutting spiral that will pass through the interdental spaces of the gear to be cut and stay within the confines thereof increases towards the rear of said series of teeth across the face of a tapered gear blank in cutting relationship with the axes about which the teeth rotate and that of the blank offset with reference to each other.

4. The method of forming a tooth face of a spiral bevel gear which comprises moving a plurality of spirally arranged cutting edges extending in a direction generally normal to the plane of the spiral and gradually increasing in distance radially from a spiral which will pass through the interdental spaces of the gear to be cut at the mean pitch circle thereof across the face of a conical bevel gear blank and simultaneously effecting a translation of the cutting edges about the axis of the blank.

5. The method of forming a tooth face of a spiral bevel gear which comprises moving a plurality of spirally arranged cutting edges extending in a direction generally normal to the plane of the spiral and gradually increasing a distance radially from a spiral which will pass through the interdental spaces of the gear to be cut at the mean pitch circle thereof across the face of a conical bevel gear blank and simultaneously rotating the blank in predetermined timed relation to the movement of said cutting edges.

6. The method of producing a spiral bevel gear which comprises moving a plurality of series of spirally arranged cutting edges extending in a direction generally normal to the plane of the spiral and gradually changing in distance radially from a spiral which passes through the interdental spaces of the gear to be cut at the mean pitch circle thereof across the face of a conical bevel gear blank and simultaneously rotating the blank in predetermined timed relation to the movement of the cutting edges.

7. The method of producing a spiral bevel gear which comprises moving a plurality of series of spirally arranged cutting edges extending in a direction generally normal to the plane of the spiral and gradually changing in distance radially from a spiral which passes through the interdental spaces of the gear to be cut at the mean pitch circle thereof across the face of a conical bevel gear blank, simultaneously rotating the blank in predetermined timed relation to the movement of the cutting edges and moving the axis of rotation of the blank in a curved path.

8. The method of cutting spiral bevel gears which comprises moving a plurality of spirally arranged cutting teeth extending in a direction generally normal to the plane of the spiral and of variable width in a direction radially of the spiral across the face of a conical gear blank, and simultaneously producing a relative translation of the teeth about the blank.

9. The method of cutting gears which comprises a series of spirally arranged cutting teeth extending in a direction generally normal to the plane of the spiral and of variable width in a direction radially of the spiral across the face of a gear blank, and simultaneously rotating the blank.

10. The method of cutting spiral bevel gears which comprises moving a series of spirally arranged cutting teeth extending in a direction generally normal to the plane of the spiral and of variable width in a direction radially of the spiral across the face of a conical gear blank, and simultaneously rotating the blank.

11. The method of cutting spiral bevel gears which comprises rotating a series of spirally arranged cutting teeth extending in a direction generally parallel with the axis of rotation thereof and of variable width in a direction radially of said axis across the face of a gear blank in cutting relationship with the axis about which the teeth rotate and that of the blank angularly positioned with respect to each other and producing a relative feeding movement between the cutter and the blank.

12. The method of cutting spiral bevel gears which comprises rotating a series of spirally arranged cutting teeth extending in a direction generally parallel with the axis of rotation thereof and of variable width in a direction radially of said axis in cutting relationship with a gear blank with the axis about which the teeth rotate and that of the blank angularly positioned with respect to each other, moving both axes in a curved path, imparting a relative feed movement between the teeth and blank, and producing a relative translation of the teeth about the periphery of the blank.

13. The method of cutting spiral bevel gears which comprises rotating a series of spirally arranged cutting teeth extending in a direction generally parallel with the axis of rotation thereof and of variable width in a direction radially of said axis across the face of a conical gear blank with the axis about which the teeth rotate and that of the conical blank angularly positioned with respect to each other at an angle corresponding to the root angle of the gear to be cut while moving both axes in a curved path and simultaneously producing a relative feed movement between the teeth and blank.

FRANK H. ADAMS.